United States Patent [19]

Tominaga et al.

[11] 4,323,135
[45] Apr. 6, 1982

[54] STRUCTURE FOR SUPPORTING A MOTORCYCLE ENGINE

[75] Inventors: Nobuyoshi Tominaga, Hamamatsu; Nobuyoshi Kurai, Iwata; Hajime Ueno; Sadahide Suzuki, both of Shizuoka, all of Japan

[73] Assignee: Yamaha Hatsudoki Kabushiki Kaisha, Iwata, Japan

[21] Appl. No.: 129,330

[22] Filed: Mar. 11, 1980

[51] Int. Cl.³ .............................................. B60K 5/12
[52] U.S. Cl. ............................... 180/228; 280/281 R
[58] Field of Search ............................. 180/219, 228; 280/281 R; 123/55 VF, 56 AA, 56 BA; 248/560, 614

[56] References Cited

U.S. PATENT DOCUMENTS

| 3,542,146 | 11/1970 | Hooper | 280/281 R |
| 3,754,612 | 8/1973 | Watanabe et al. | 180/228 |
| 3,811,528 | 5/1974 | Hooper | 180/228 |
| 4,230,074 | 10/1980 | Ichikawa et al. | 123/55 VF |

FOREIGN PATENT DOCUMENTS

| 1110540 | 7/1961 | Fed. Rep. of Germany | 180/228 |
| 857049 | 12/1960 | United Kingdom | 180/228 |

*Primary Examiner*—Joseph F. Peters, Jr.
*Assistant Examiner*—Donn McGiehan
*Attorney, Agent, or Firm*—Donald D. Mon

[57] ABSTRACT

A V-shaped engine, with its "V" lying in a forwardly-extending frame, has a front cylinder, a rear cylinder, and a crank-case beneath the cylinders. A frame surrounds an area above and rearwardly of the engine. The front cylinder and a rear portion of the crankcase are secured to the frame. Elastic means connects the rear cylinder to the frame.

3 Claims, 7 Drawing Figures

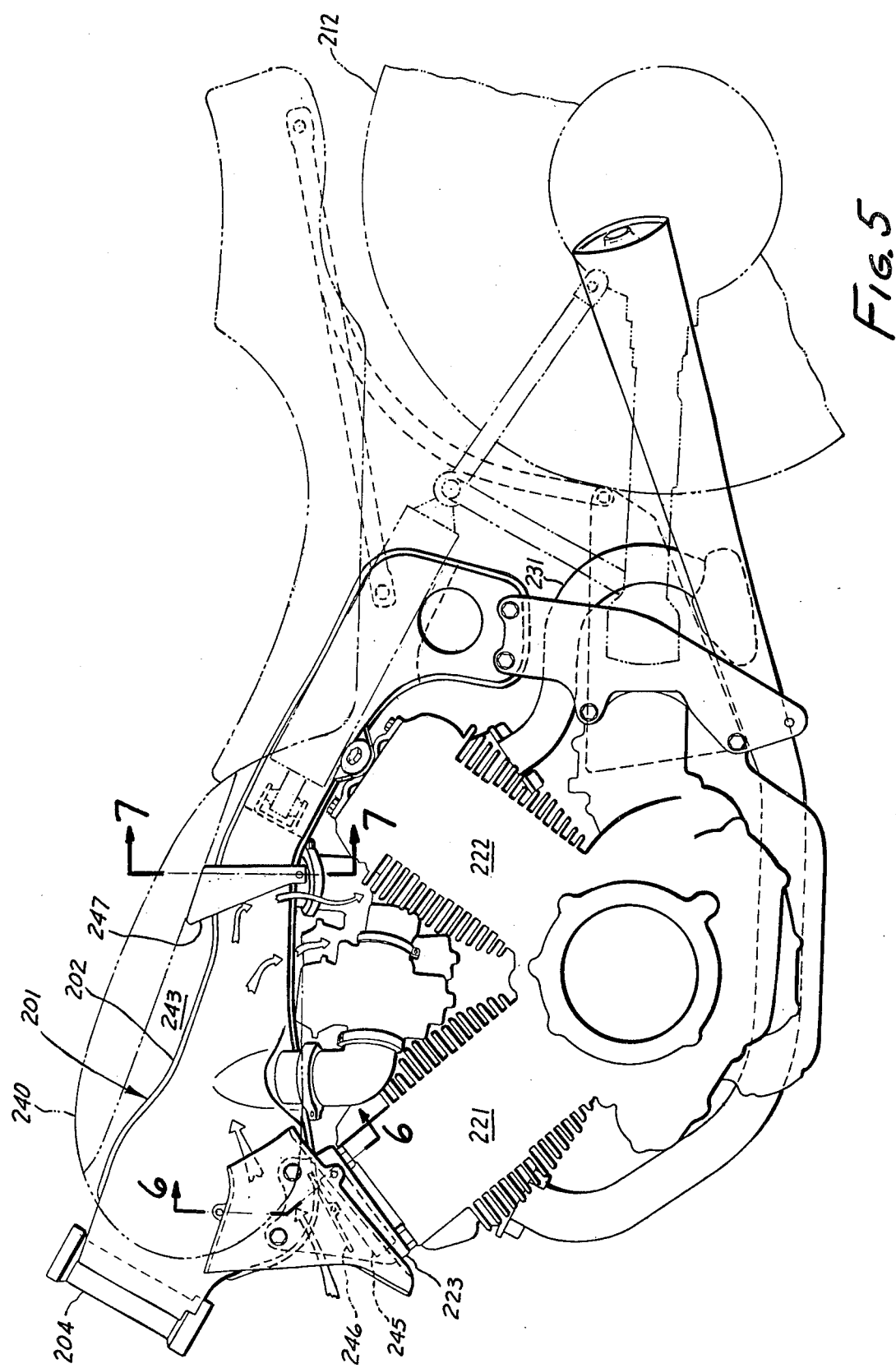

STRUCTURE FOR SUPPORTING A MOTORCYCLE ENGINE

FIELD OF THE INVENTION

This invention relates to the suspension of engines in motorcycle frames.

BACKGROUND OF THE INVENTION

An engine mounted on a motorcycle is deformed by its own heat. The deformation may be slight, but in operation it is significant. With particular reference to a V-shaped engine, it is necessary to provide means for absorbing any variation in the spacing between the cylinders when suspending the cylinders from a frame in order to mount the engine. When elastic means is used to suspend the cylinders from the frame, however, the frame itself must be sufficiently rigid to withstand the load, thereby disadvantageously increasing the overall weight of the vehicle.

In view of this situation, it is an object of this invention to provide an engine-supporting structure applicable to a motorcycle provided with a V-shaped engine which has a front cylinder and a rear cylinder disposed longitudinally of one another along the forward axis of the motorcycle. The structure is highly rigid, light in weight, and capable of absorbing fully the thermal deformation of the engine. This objective is attained by a structure comprising a frame surrounding the area above and behind the engine, and to which the front cylinder and the rear portion of a crank case are secured, and elastic means by which the rear cylinder is supported on the frame.

The above and other features of the invention will be fully understood from the following detailed description and the accompanying drawings, in which:

BRIEF DESCRIPTION OF THE DRAWINGS

FIG. 5 is a fragmentary side view of a motorcycle similar to the one shown in FIG. 1, showing another useful feature;

DETAILED DESCRIPTION OF THE INVENTION

Figure 1:
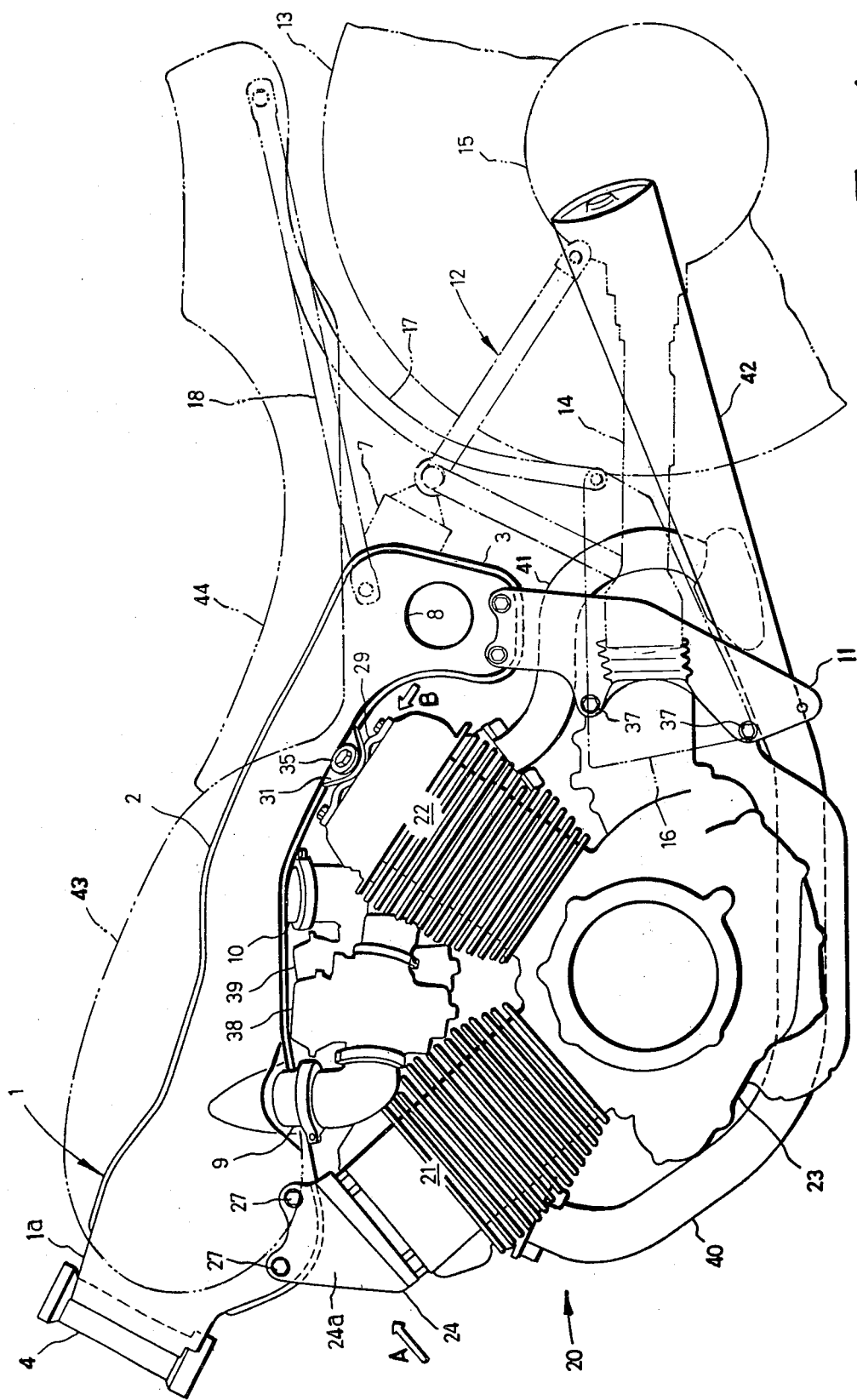
FIG. 1 is a fragmentary side elevation of a motorcycle incorporating the invention.
Figure 3:
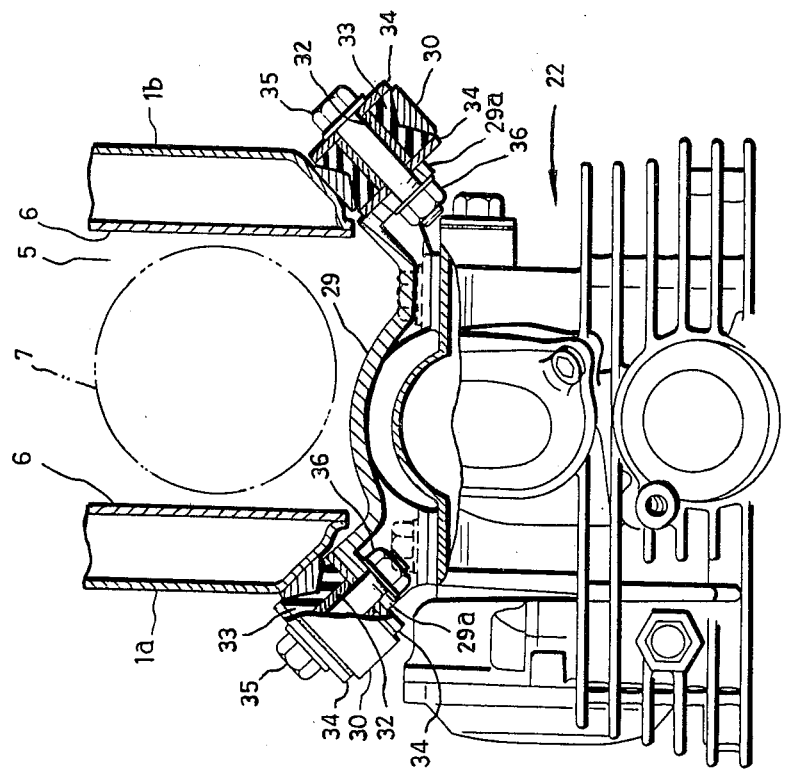
FIGS. 2 and 3 are views taken in the directions of arrows A and B, respectively, in FIG. 1.

In FIG. 1, which shows the presently-preferred embodiment of the invention, numeral 1 indicates a main frame formed substantially in the shape of a box by a pair of side members 1a and 1b made of metal plates and joined together. The main frame 1 includes a tank rail portion 2 and a bent portion 3 adjacent to the rear end of the tank rail portion 2. A steering head pipe 4 is welded to the front end of the tank rail portion 2. The main frame 1 is bifurcated in a region from the rear portion of the tank rail portion 2 to the upper portion of the bent portion 3 to define a suspension chamber 5 therein. In the region from the rear half of the tank rail portion 2 to the bent portion 3, the metal plate members 1a and 1b project transversely of the vehicle with their inner faces departing from each other, and an inner plate 6 is welded to each of the members 1a and 1b to close the inner opening of the frame (FIG. 3). The suspension chamber 5 contains a suspension 7 with an oleo damper, and the suspension 7 has a front end pivotally connected to the inner plates 6. The two metal plate members 1a and 1b are joined to each other at the bottom of the bent portion 3. In the bent portion 3, the metal plate member 1a is formed with a circular opening 8. An air cleaner not shown is disposed by the side of the opening 8. Air enters the main frame 1 through the air cleaner and the opening 8. Referring to FIG. 1, numerals 9 and 10 denote intake pipes connected to the tank rail portion 2, through which the air entering the main frame 1 through the opening 8 is introduced into the cylinders of an engine 20.

A pair of transversely spaced brackets 11 are secured rigidly to the bent portion 3 of the main frame 1 in depending relation therefrom, and form substantially a part of the main frame 1. The main frame 1 and the brackets 11 are formed so as to surround the area above and behind the engine 20.

A rear arm 12 having a substantially triangular configuration in side elevation is supported vertically rotatably between the brackets 11. The rear arm 12 comprises a pair of transversely spaced triangular sections holding a rear wheel therebetween. The bottom of the left triangular section defines a propeller shaft casing 14 having a rear end to which a gear case 15 is connected. A propeller shaft not shown extends within the propeller shaft casing 14, and the gear case 15 contains a large reduction gear engaging the propeller shaft, but not shown. Thus, there is defined a driving mechanism of the shaft drive type. The rear end of the suspension 7 is pivotally connected to the top of the rear arm 12.

A side plate 16 extending longitudinally of the vehicles is rigidly secured outside each bracket 11, and has a rear end to which the lower end of a rear stay 17 is bolted. The rear stay 17 is welded integrally to a seat rail 18 having a front end bolted to the main frame 1. The rear stay 17 and the seat rail 18 are, thus, removable, and changeable to different ones easily to provide vehicles conforming to different specifications. The removability of the rear stay 17 and the seat rail 18 makes it easy to manufacture the main frame 1 which is manufactured in an entirely different process from the rear stay 17 and the seat rail 18, and also facilitates the transportation of the parts.

Figure 2:
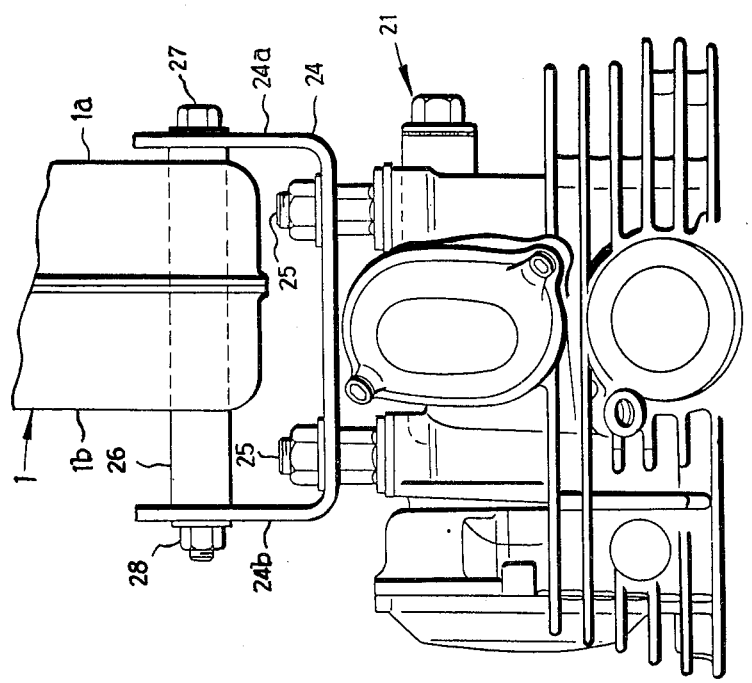

The engine 20 is an air-cooled overhead cam shaft V-shaped engine having a pair of cylinders 21 and 22 disposed longitudinally of the vehicle. The heads of the cylinders 21 and 22, and the rear end of a crank case 23 are supported on the main frame 1 and the brackets 11. A bracket 24 having a channel-shaped cross section as shown in FIG. 2 is secured to the head of the front cylinder 21 by four bolts 25 extending from the cylinder head. The bracket 24 has a pair of oppositely disposed sections 24a and 24b between which the tank rail portion 2 of the main frame 1 is positioned in spaced apart relation therefrom. A pair of collars 26 extending transversely of the vehicle are secured to the tank rail portion 2, and the bracket 24 is rigidly secured by bolts 27 extending through the collars 26, and nuts 28.

A bracket 29 is secured to the head of the rear cylinder 22. The bracket 29 has a pair of mounting surfaces 29a which extend transversely of the vehicle, and are downwardly inclined. A ring 30 opposite to each mounting surfaces 29a is secured to the main frame 1 by a bracket 31 (FIG. 1). Each ring 30 is filled with an elastic member 33 formed from rubber, having a collar 32 in its center. The elastic member 33 is sandwiched between a pair of washers 34, and a bolt 35 extends through the washers 34, the collar 32 and the mounting surfaces 29a, and is held in position by a nut 36. Thus, the elasticity of the elastic members 33 renders the bracket 29 for the rear cylinder 22 slightly movable.

The rear end portion of the crank case 23 for the engine 20 is secured by two bolts 37 to the brackets 11 forming substantially a part of the main frame 1.

Thus, the front cylinder 21 and the crank case 23 form a substantially diamond-shaped loop with the main frame 1 and the brackets 11, and the rear cylinder 22 extends across the loop. As the front cylinder 21 and the crank case 23 are secured to the main frame 1 and the brackets 11, respectively, the engine 20 per se acts as a reinforcing member to increase the overall rigidity of the vehicle. The rear cylinder 22 adds further to the rigidity of the vehicle, as it extends across the aforementioned generally diamond-shaped loop in a manner dividing it into two triangular sections.

Variation in the temperature of the engine 20 slightly deforms the engine parts, and causes them to expand and contract slightly. The expansion and contraction of the front cylinder 21 and the crank case 23 are absorbed by the slight deformation of the generally diamond-shaped loop as a whole, including the main frame 1 and the brackets 11. The head of the rear cylinder 22 undergoes a relatively large amount of displacement, since the angle between cylinders 21 and 22 is affected by temperature variations. The displacement of this cylinder head is absorbed by deformation of the elastic members 33 by which the rear cylinder 22 is connected to the main frame 1.

Referring to FIG. 1, carburetors 38 and 39 are provided between the intake pipes 9 and 10, and the front and rear cylinders 22 and 21, respectively. Numeral 40 indicates an exhaust pipe for the front cylinder 21, and 41 an exhaust pipe for the rear cylinder 22 extends between the rear frames 12, and joins the exhaust pipe 40 leading to a muffler 42.

In FIG. 1, numeral 43 denotes a fuel tank, and 44, a seat.

It will be understood from the foregoing description that the combination according to this invention comprises a frame surrounding the area above and behind an engine having a front and a rear cylinder, and to which the front cylinder and the rear portion of a crank case are secured, and elastic means by which the rear cylinder is supported on the frame, the engine per se cooperates with the frame to increase the rigidity of the vehicle. Therefore, the rigidity of the frame can be lowered without disadvantage, and the frame can therefore be reduced in weight. As the head of the rear cylinder is movable upon deformation of the elastic means, it is possible fully to absorb thermal deformation of the engine.

When a V-shaped engine is mounted on a motorcycle in such a manner that its cylinders are aligned longitudinally of the vehicle, it is difficult to provide exhaust pipes having an equal length for both the front and rear cylinders. Although the situation may differ with the positions of the pipes, it is generally the case that the exhaust pipe for the rear cylinder is much shorter than that for the front cylinder, if the exhaust pipe for the front cylinder is connected to the front portion thereof, and that for the rear cylinder to the rear portion thereof. Accordingly, the exhaust pipes create a large difference in the resistance to the flow of exhaust gas therethrough, so that the conditions of combustion differ between the front and rear cylinders. However, it is desirable to operate the front and rear cylinders under the same conditions as far as possible.

Figure 4:
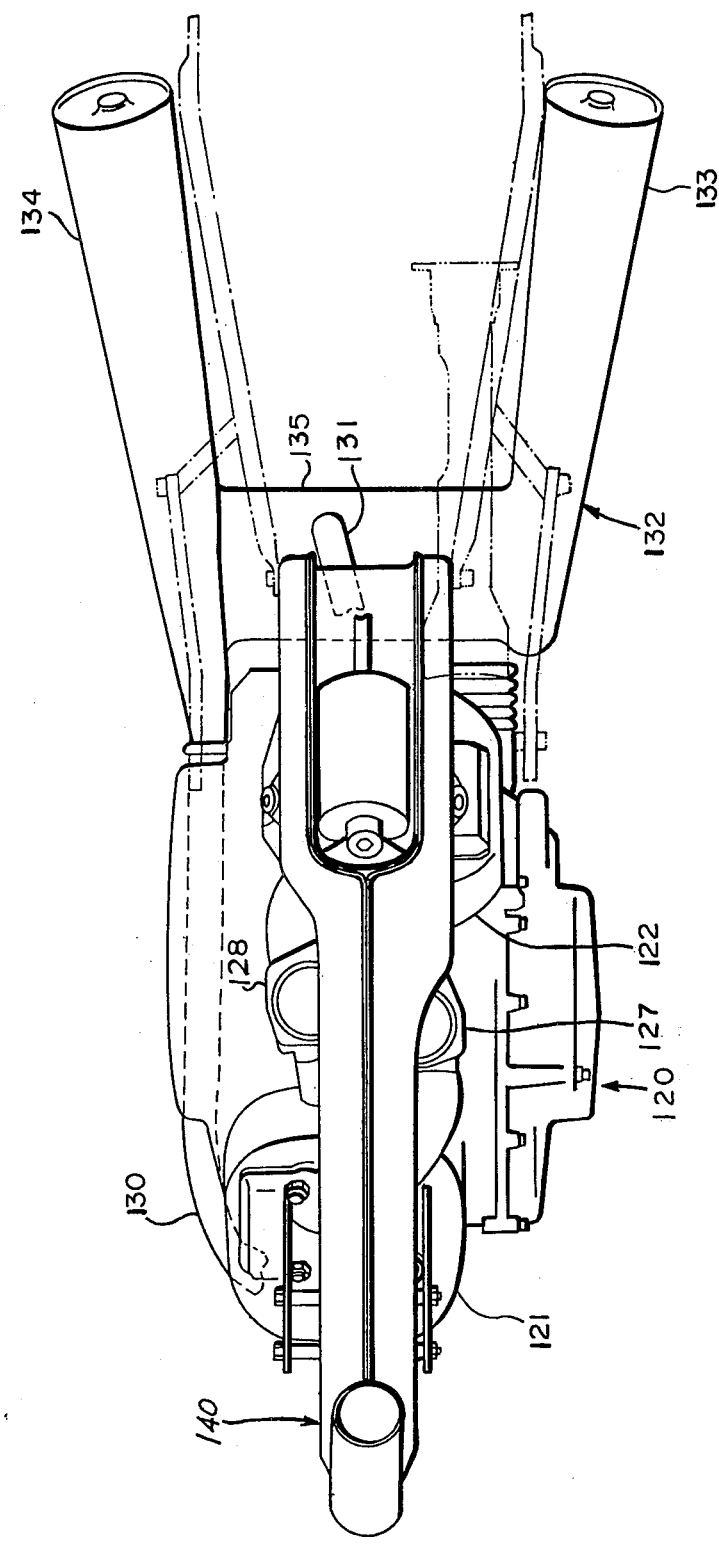
FIG. 4 is a topview of a motorcycle incorporating useful features.

The exhaust system illustrated in FIG. 4 is intended for equalizing the resistance to the flow of exhaust gas in the exhaust pipes connected to the front and rear cylinders to unify the conditions of combustion in both of the cylinders to thereby improve the exhaust gas composition, fuel consumption, and other properties of the engine as a whole. According to this exhaust system, exhaust pipes having different inside diameters are connected to the front and rear cylinders.

Referring to the drawing, numerals 130 and 131 indicates exhaust pipes. The exhaust pipe 30 for the front cylinder 121 is connected to the front portion of the front cylinder 121 and extends through a region below the engine 120 on the lefthand side thereof. The exhaust pipe 131 for the rear cylinder 122 is connected to the rear portion of the rear cylinder 122 and extends between a pair of brackets 110 and rear arms 111. A muffler 132 comprises a pair of transversely spaced muffler tubes 133 and 134, and an expansion chamber 135 is disposed below the rear arms 111 in a position closer to the brackets 110, and the muffler tubes 133 and 134 extend rearward therefrom. The exhaust pipe 130 for the front cylinder 121 is connected to the right-hand muffler tube 133, while the exhaust pipe 131 for the rear cylinder 122 is connected to the expansion chamber 135.

As the exhaust pipe 130 extends along a path surrounding the area below the engine 120, it is very long as compared with the exhaust pipe 131, but has a greater inside diameter. The inside diameters of the exhaust pipes 130 and 131 are so selected as to equalize substantially the resistance to the flow of exhaust gas through both of them. As the exhaust pipe 130 for the front cylinder 121 is longer than the exhaust pipe 131 for the rear cylinder 122, it creates a greater resistance to exhaust gas if it is equal in inside diameter to the exhaust pipe 131. Therefore, the exhaust pipe 130 has a greater inside diameter than the exhaust pipe 131.

Air is introduced into the cylinders 121 and 122 through respective intake pipes and carburetors. Exhaust gases are released from the cylinders 121 and 122 under equal conditions, because the inside diameters of the exhaust pipes 130 and 131 have been selected so as to eliminate any difference in the resistance to the flow of exhaust gas therethrough. Thus, combustion takes place under equal conditons in the cylinders 121 and 122, and the differences in the exhaust gas composition, fuel consumption, and other properties of the cylinders 121 and 122 can be reduced.

Also, in a motorcycle in which an air-cooled V-shaped engine is mounted in such a manner that their cylinders are disposed one behind the other longitudinally of the vehicle, insufficient air blows against the rear cylinder positioned behind the front cylinder. There is therefore the likelihood that the temperature of the rear cylinder may rise to the extent which may adversely affect its power generating capacity.

Figure 7:
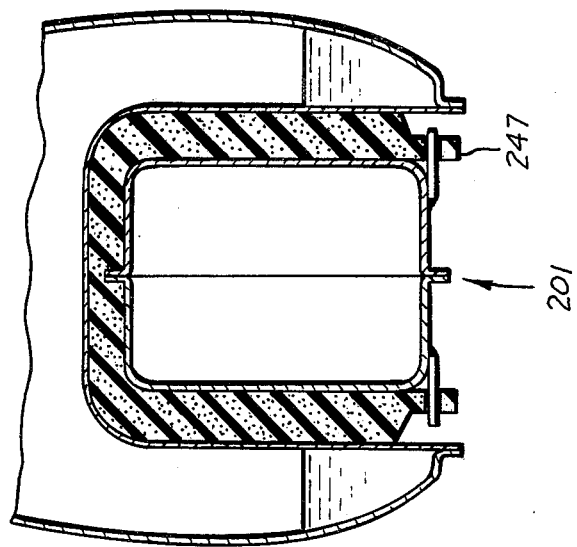
FIG. 7 is a section taken at line 7—7 in FIG. 5.
Figure 6:
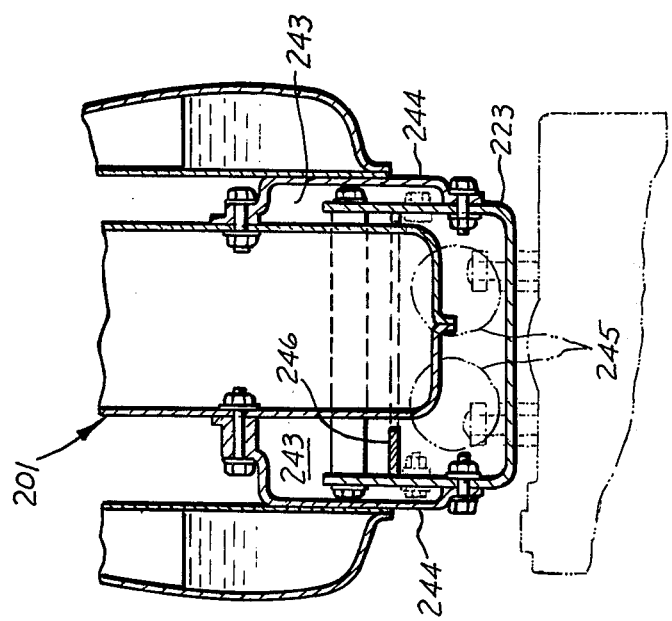
FIG. 6 is a section taken at line 6—6 in FIG. 5.

The structure which will hereinafter be described is shown in FIG. 5-7, and is intended for improving the cooling of the rear cylinder to control elevation in the temperature thereof effectively. In order to attain this object, there is defined an air passage between the tank rail portion of the main frame, and the inner surface of the fuel tank extending over the tankrail portion. The air passage is provided above the rear cylinder with means for guiding air downwardly when the motorcycle is running, so that the air may be guided to the rear cylinder through the air passage.

A pair of transversely spaced apart air guide plates 244 are secured between a bracket 223 and the main frame 201 to draw air from the area under the steering head pipe 204 into an air passage 243. A pair of ignition coils 245 are secured within the bracket 223 adjacent to the bottom thereof, and extend in parallel to the longitudinal axis of the vehicle. A baffle plate 246 extending across the bracket 223 is secured above the ignition coils 245. The baffle plate 246 directs air upwardly to improve its inflow into the air passage 243 while the vehicle is running.

An air guide member 247 is mounted above the rear cylinder 222 to close the air passage 43. The air guide member 247 is formed from rubber or neoprene foam rubber, and its opposite ends are locked by a pair of locking pins secured to the tank rail portion 202 and extending laterally from the bottom thereof. The air guide member 247 has a front face inclined forwardly and upwardly as shown in the drawing. The air passage 243 downwardly toward the rear cylinder 222, and also serves as a member for preventing the vibration of a fuel tank 240, while the vehicle is running.

When the vehicle is running, air, or the wind generated around the vehicle enters the air passage 243 through the area under the steering head pipe 204 as it is guided by the air guide plates 244, the baffle plate 246, the bracket 223, etc. The air flows through the air passage 243, impinges against the front face of the air guide member 247 and is directed downwardly, and blows against the rear cylinder 222. The air flowing past the rear cylinder 222, while cooling it, flows along an exhaust pipe 231 behind the rear cylinder 22 and is released toward a rear wheel 212. Thus, the exhaust pipe 231 for the rear cylinder 222 can also be cooled effectively.

Although in the embodiment described above, the tank rail portion 202 is shaped like a box in cross section, it is obvious that the present structure is also applicable to a tank rail formed from a pipe. The air guide plates 244 and the baffle plate 246 promote the inflow of air into the air passage 243.

It will be understood from the foregoing description that according to the present structure in which while the vehicle is running, air is directed into the rear cylinder through the air passage defined between the tank rail and the inner surface of the fuel tank, it is possible to improve the cooling of the rear cylinder, and prevent any elevation of its temperature that may lower its power generating capacity.

This invention is not to be limited by the embodiments shown in the drawings and described in the description which are given by way of example and not of limitation, but only in accordance with the scope of the appended claim.

We claim:

1. In combination: a V-shaped internal combustion engine having a front cylinder, a rear cylinder, and a crankcase joining said cylinders in a V-shaped array, said crankcase having a substantial dimension extending rearwardly of said front cylinder, and forming a generally V-shaped structure with it; a motorcycle frame having a portion overhanging said cylinders, and a rear portion rearward of said engine forming a generally V-shaped structure, said frame having an axis of forward motion, said engine being mounted to said frame with the top of said front cylinder rigidly mounted to said frame portion, said crankcase being rigidly connected to said rear frame portion, the said structures forming a generally diamond-shaped rigid array, said rear cylinder extending toward said frame; and elastic means elastically attaching said rear cylinder to said frame enabling said rear cylinder to change its orientation relative to said front cylinder and crankcase without distortion of said engine caused by the interconnection of the top of said rear cylinder and said frame.

2. A combination according to claim 1 in which said elastic means comprises bolt means, an elastic isolation sleeve mounted to said bolt means, and a collar mounted to said sleeve and isolated from said bolt means by said sleeve.

3. A combination according to claim 2 in which two of said elastic means are provided, said bolt means being disposed at an angle relative to the said axis.

* * * * *